United States Patent [19]
Guha

[11] Patent Number: 5,319,639
[45] Date of Patent: Jun. 7, 1994

[54] CROSSBAR WITH RETURN NET FOR SCALABLE SELF-ROUTING NON-BLOCKING MESSAGE SWITCHING AND ROUTING SYSTEM

[75] Inventor: Aloke Guha, Minneapolis, Minn.

[73] Assignee: Honeywell Inc., Minneapolis, Minn.

[21] Appl. No.: 49,646

[22] Filed: Apr. 19, 1993

Related U.S. Application Data

[63] Continuation of Ser. No. 740,261, Aug. 5, 1991, abandoned.

[51] Int. Cl.⁵ ........................ H04Q 3/00; H04Q 11/04
[52] U.S. Cl. .................................... 370/60; 370/58.1; 340/825.79; 340/825.87; 379/291; 379/306
[58] Field of Search ................ 370/53, 54, 58.1, 58.2, 370/58.3, 60, 60.1, 94.1; 340/825.79, 825.8, 825.85, 825.87, 825.89; 379/258, 268, 291, 306, 335

[56] References Cited

U.S. PATENT DOCUMENTS

| | | | |
|---|---|---|---|
| 4,516,238 | 5/1985 | Huang et al. | 370/60 |
| 4,542,497 | 9/1985 | Huang et al. | 370/60 |
| 4,635,250 | 1/1987 | Georgiou | 379/291 |
| 4,696,000 | 9/1987 | Payne, III | 370/60 |
| 4,706,240 | 11/1987 | Payne, III | 370/60 |
| 4,725,835 | 2/1988 | Schreiner et al. | 340/825.83 |
| 4,817,082 | 3/1989 | Orsic | 370/58.1 |
| 4,833,468 | 5/1989 | Larson et al. | 340/825.8 |
| 4,914,429 | 4/1990 | Upp | 370/58.1 |
| 4,984,237 | 1/1991 | Franaszek | 370/60 |
| 4,991,168 | 2/1991 | Richards | 370/54 |
| 5,001,702 | 3/1991 | Teraslinna et al. | 370/60 |
| 5,022,025 | 6/1991 | Urushidiani et al. | 370/60 |

OTHER PUBLICATIONS

Dias, et al, "Design and Analysis of a Multistage Voice-Data Switch", Globe Com '87, pp. 1856–1860.
Douglass, et al, "Self-Routing and Route Balancing in Connection Networks", 1990 Int'l. Conference on Parallel Processing, pp. L331–L337.
Ta, et al, "A High Speed Integrated Services Switch Based on 4×4 Switching Elements", IEEE 1990, pp. 1164–1171.
EPA 0 195 589, "Switching System for Transmission of Data", published Sep. 1986, P. A. Franaszek, Inventor.
EPA 0 224 244, "Switching System Having Multiple Parallel Switching Networks", Published Jun. 3, 1987; W. A. Payne, Inventor.
EPA 0 405 208, "Multistage Network with Distributed Pipelined Control", Published Jan. 2, 1991, P. A. Franaszek, Inventor.
EPA 0 097 360, "Modular Self-Routing PCM Switching Network with Virtual-Channel Routing Control for Distributed Control Telephone Exchanges", Published Jan. 4, 1984, P. Belforte, et al.
Tobagi, "Fast Packet Switch Architectures for Broadband Integrated Services Digital Networks", Proceeding of the IEEE, vol. 78, No. 1, Jan. 1990, pp. 133–167.
Lin et al., "Two-Dimensional Optical Clos Interconnection Network and its uses", Applied Optics, vol. 27, No. 9, May 1, 1988, pp. 1734–1741.
Clos, "A Study of Non-Blocking Switching Networks", Bell System Technical Journal, Mar. 1953, pp. 406–424.

*Primary Examiner*—Douglas W. Olms
*Assistant Examiner*—Alpus H. Hsu
*Attorney, Agent, or Firm*—Michael B. Atlass

[57] ABSTRACT

A crossbar useful for self-routing messages is described having a return network that can return all messages, or their headers, that encounter a busy node at the output. A system is described in which this crossbar with return network can operate as a building block. It is particularly well suited to systems where truly non-blocking networks are required.

5 Claims, 9 Drawing Sheets

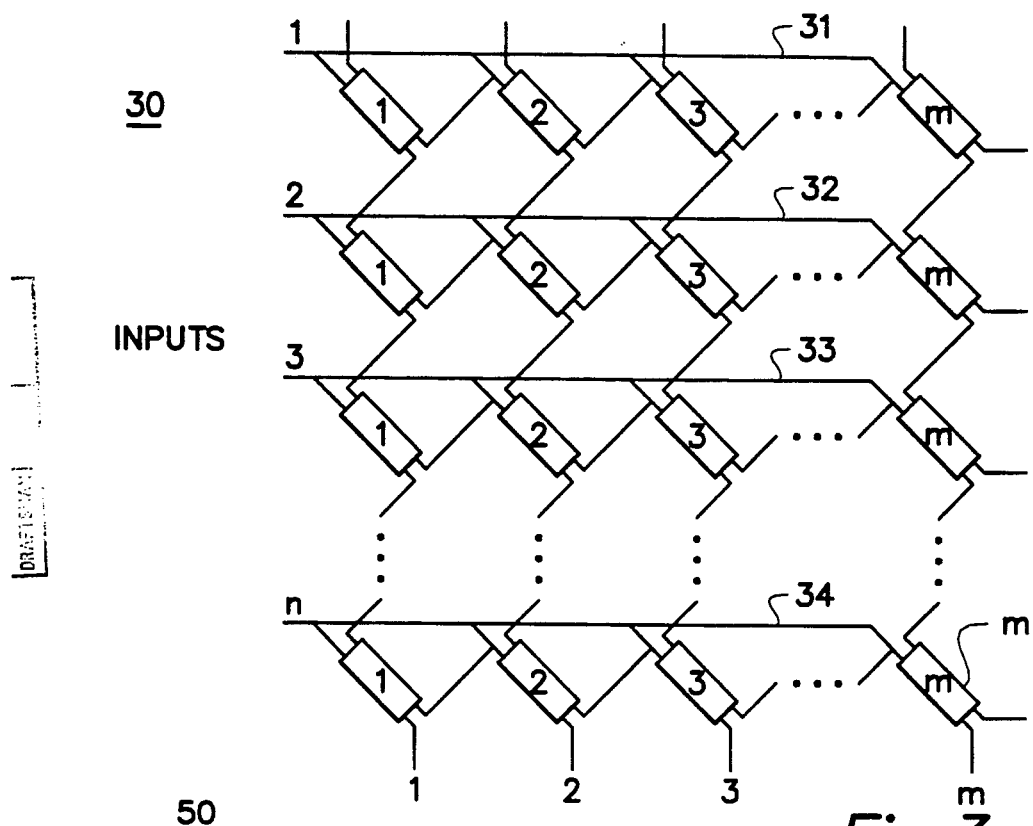
Fig. 3
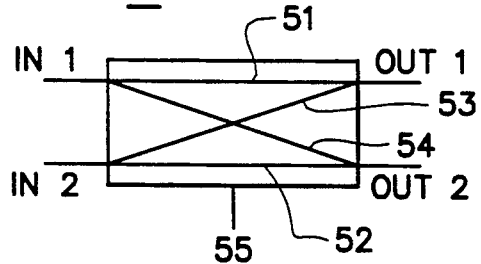
Fig. 5A
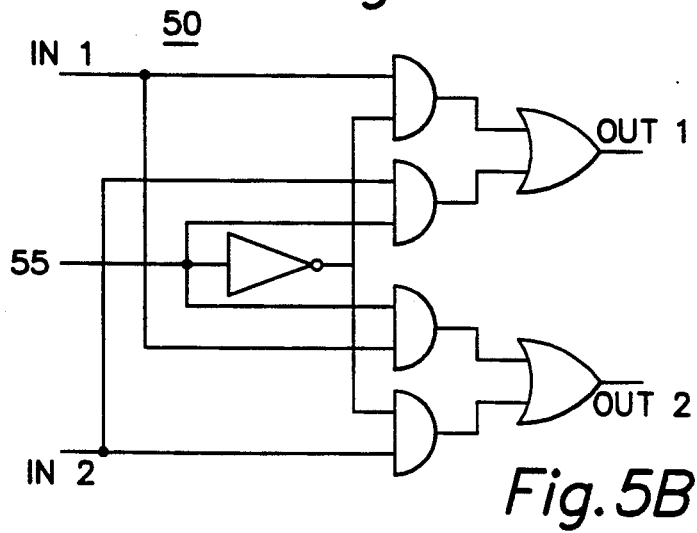
Fig. 5B
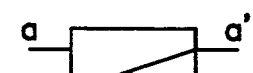
Fig. 6A(i)
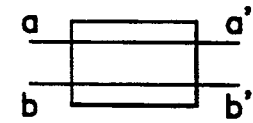
Fig. 6A(ii)
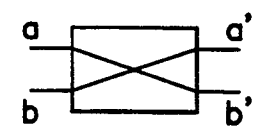
Fig. 6A(iii)

FINITE STATE MACHINE MODEL OF THE BUS CONTROLLER

POSSIBLE IMPLEMENTATION OF DATA/BUS CONTROLLER USED IN Fig.13

5,319,639

CROSSBAR WITH RETURN NET FOR SCALABLE SELF-ROUTING NON-BLOCKING MESSAGE SWITCHING AND ROUTING SYSTEM

This application is a continuation of application Ser. No. 07/740,261, filed Aug. 5, 1991 now abandoned.

This invention relates to a self-routing, non-blocking switch system for routing messages from any one of a number of inputs to any one of a number of outputs in an efficient and cost effective manner.

BACKGROUND OF THE INVENTION

As data transfer becomes more and more complex, the numbers of the messages which need to be transferred across a network from one location to another, or one area of a computing device to another, has grown remarkably. Accordingly, any system or subcomponent thereof which allows for ease of routing messages from any of a large number of inputs to any particular one of a large number of outputs is important. The invention described herein allows for the routing of such messages with very little overhead, at high speed.

The invention herein employs a return network, is capable of using different kinds of switches in the switching network, may operate in a broadcast mode, may reduce the number of switches necessary by using a Clos network or by reliance on busses and controllers, and uses a self-routing algorithm, eliminating the need for preprocessing overhead.

Self-routing algorithms use information contained in the message itself to route the message at the switch level to the desired location.

Prior self-routing algorithms such as the one described in the 1990 IEEE (Vol. 78, No. 1), entitled "*Fast Packet Switch Architectures for Broad-Band Integrated Services Digital Networks*", by Tobagi, do not indicate how these algorithms can actually operate, and do not describe how their operation can be accomplished when using a Clos-type network.

Clos networks are preferred for larger networks because they reduce the number of switches necessary to accomplish a N×N message switching system to a much smaller number than N². See, for example, U.S. Pat. No. 4,696,000, issued to Payne, which refers to the Clos network and rearrangeable networks.

The invention described herein simplifies all these ideas.

The switches may be arranged in a standard crossbar network for small scale implementations, a Clos network or a variation of a Clos network using busses, and the types of switches and routings, dependent on the switch type used, may also vary depending on the implementation. As described in the detailed description, a preferred implementation employs a return network for all blocked messages that wish to address the same output node and returns them to the source or sending node. Due to the nature of the routing system itself and the construction of the switching network, essentially no overhead or preprocessing is required to route messages through the system described from the input nodes to the output nodes.

BRIEF DESCRIPTION OF THE DRAWINGS

FIG. 3 is a layout of a second implementation of an n by m crossbar.

FIG. 5a is a schematic diagram of 2×2 crossbar switch.

FIG. 5b is a diagram of a gate-level implementation of the switch described in FIG. 5a.

FIGS. 6a (i), (ii), and (iii) are three possible modes of operation of the 2×2 broadcast switch.

SUMMARY OF THE INVENTION

Crossbar With Return Net

Figure 1:
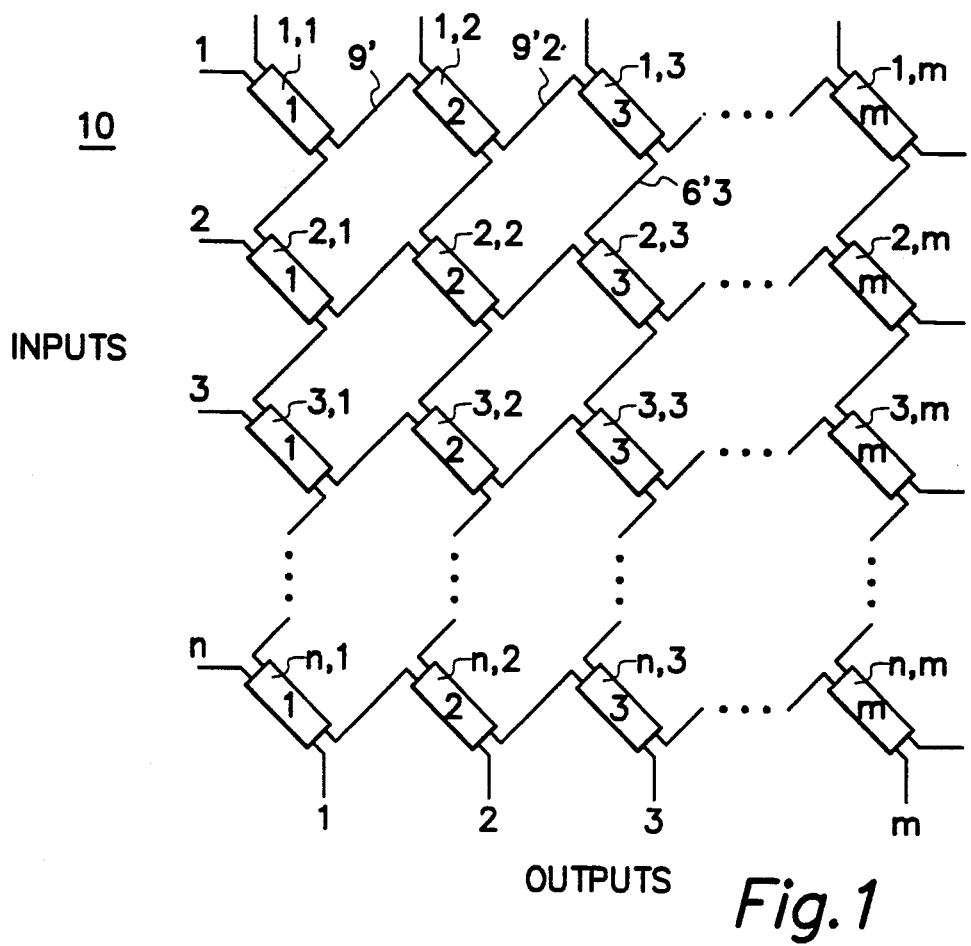
FIG. 1 is a two-dimensional layout of the switches in an N×N crossbar.

This invention teaches a crossbar for use in a switching system which switches messages and returns messages which do not get through on the first try. I has headers in the messages wherein the headers have source and destination address and two turn signal indicators which are both set at the time the message is sent. The crossbar has a number of inputs, n, and a number of outputs, m, wherein the m inputs are connected by an n×m array of 2×2 switches organized into logical columns and logical rows labeled 1 to m and 1 to n, respectively, and wherein the switches are connected between the n input sources and the m output destinations. The two-by-two switches may be set into a pass or exchange mode (but are all set into the same mode, called a default mode, at the outset) based on the coincidence of two events, first that the message header destination address matches the column address of the switch and second that the turn signal has not already been reset by a previous switch having a matching column address. The crossbar has in communicative association therewith a return network having similar or identical 2×2 switches organized into logical diagonals with respect to the logical organization of the crossbar switches. The longest diagonal having the highest number of switches has addresses in its switches matching row 1. Succeedingly smaller diagonals have succeeding larger addresses, and less switches. The ultimate diagonal has only one switch of address "n". (The longest diagonal may be shortened by one switch, as mentioned in the detailed description.)

These 2×2 switches are also setable into pass or exchange mode based on the coincidence of two events, but all set into the one mode, called default mode, at the outset. The first event is that the message header source address matches the diagonal address of the return net switch. The second event is that the turn signal has not already been reset by a previous switch with the same column address.

DETAILED DESCRIPTION OF THE INVENTION

Several concepts are included here which are all centered on the idea that self-routing algorithms may be employed to provide local control of 2×2 switches which comprise various networks. In doing this, the need for a global controller monitoring all of the inputs and all of the outputs, and their connections, is not required. Where plain crossbars are used, a total of NM of the 2×2 switches would be required for an N input and M output network. Because the switches are relatively simple in functionality and layout of the design would be extremely regular, such networks can be fabricated easily in electronic as well as optical implementations. Using a Clos variety of truly non-blocking switching network, even the number of switches may be substantially reduced. Even further reductions in the number of switches required is possible using the bus design. This kind of savings improves the scalability of the inventive concepts described herein.

For example, in a 36×36 network using a straight crossbar design, 1,296 2×2 switches would be required. Using a Clos network design, only 1,188 switches would be required. When moving to a network of approximately 128×128 design, 16,384 switches would be required, whereas with a Clos design, only 9,936 switches would be required.

An additional and important part of this set of inventions is the use of a return network. The return network operates to return messages that attempt to route themselves to outputs which are already occupied. This re-routing or routing back is automatic, and takes less time than a time-out, especially in larger networks, to inform the sending node that the message has not gotten through. (A timeout is a counter or timer that waits some increment longer than the maximum delay, and upon finding the time expired or the counter full, a new action is begun.)

In providing this description, some terminology ought first be defined. The first definition would be "Truly Non-Blocking Networks" (TNBs). A truly non-blocking network is one in which rearrangement of existing conditions is not required in order that every message get through. It requires a set of features, including the following:

(i) setting the appropriate network switches for all requested connections,
(ii) ensuring that no conflict occurs (a conflict occurs when multiple inputs are connected to the same output),
(iii) in the event of a conflict, only one connection may be satisfied while the other requests must be kept waiting or informed,
(iv) in case of broadcasting networks, the control must also allow a single source to be connected to multiple outputs.

The inventive concepts described in this application show how TNBs can provide for practical implementation for high speed and high band width applications using a distributed local routing control. (They are principally oriented toward electrical switching but additional benefits can be gained using optical switching, such as no separate line being required for a return signal.)

The crossbar switch in general can be thought of as a square or rectangular two-dimensional array connecting a set of inputs to an equal or, if rectangular, unequal, number of outputs. Thus, for N inputs and M outputs, a crossbar has NM crosspoints and can simultaneously provide any combination of input and output one-to-one connections in a non-blocking manner. In practice, other methods besides using an array of switches, where each switch represents a crosspoint, have been used. These include for example, in electronics, bus arbitrated architecture used to simplify the quadratic complexity of switches and control and, in optics, outerproduct matrix multiplying architectures have been used. The primary approach here is to use switch level design for self-routing.

A TNB that requires less switches than are required in a crossbar was first proposed by Clos in *A Study of Non-Blocking Switching Networks*, Bell System Technical Journal, 32, pp. 406–424, 1953. A general Clos network (CN) has an odd number, say, $2k+1$ (where $k=1,2,\ldots$), of stages and is built in a modular design employing a multiplicity of crossbars which are substantially smaller than the total N×N size desired. Thus, the number of switches which would be required for a Clos network would be on the order of $N \times \sqrt{N}$, when a comparably sized crossbar would be N×N. (See above paragraph.) Also, networks of more than three stages can be built from three-stage networks by successively replacing the center-stage by another three-stage CN.

It is known that in a N×N Clos network, if the input stage is built of r crossbars of dimension n×m where $rn=N$, the second stage is made up of m, r×r crossbars, and the third stage is made up of r, m×n crossbars. The size of a crossbar can be designated with the sequence (n,m,r). The Clos network will be truly non-blocking if $m \geq 2n-1$. The CN is not truly non-blocking but may be rearrangeably non-blocking if $m < 2n-1$.

It is not particularly desirable to have a rearrangeably non-blocking network in that messages may be required to be interrupted to rearrange the network when such rearrangement becomes necessary. For applications, therefore, requiring long duration or large messages, interruptions are extremely undesirable.

Refer first to FIG. 1 in which a simple crossbar network (10) is shown. It has inputs 1 through n and outputs 1 through m as shown, and each one of the 2×2 switches may be labeled as points in a matrix or, 1,1 to n,m. The switches may be labeled with their column address only since this is the one which will be compared with the message header as will be explained later.

Figure 8:
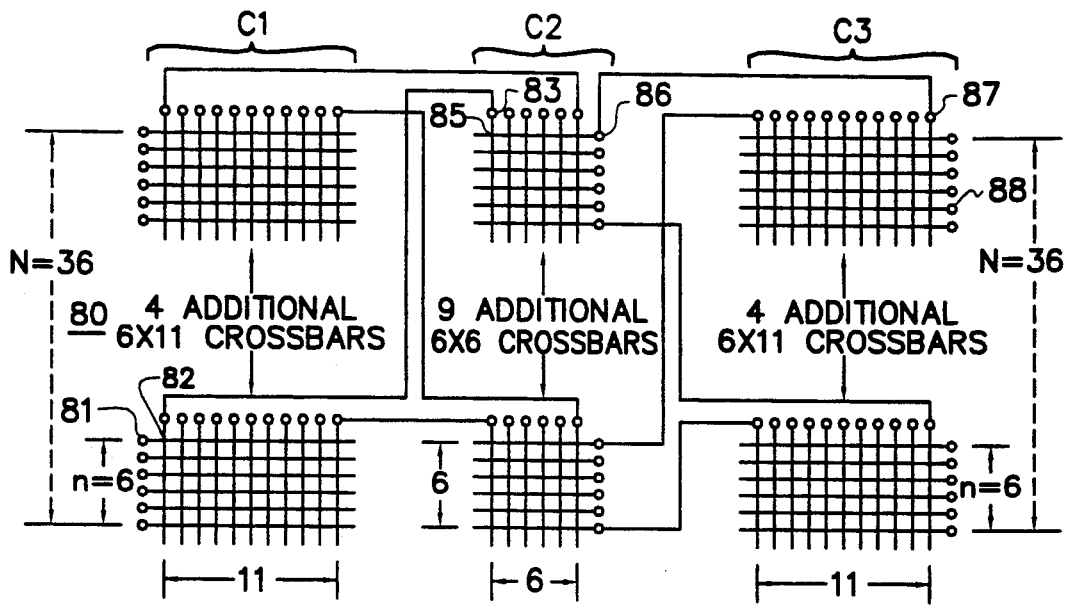
FIG. 8 is a 36×36 Clos network diagram.

In FIG. 8, a Clos network is drawn for a 36×36 array of inputs to outputs. The network is comprised of 6, 6×11 crossbars in column 1, plus 11, 6×6 crossbars in column 2, plus another 6, 11×6 crossbars in column 3. Thus, an input on line 81 may be directed at switch or crosspoint 82 to connect to the first top line 83 of crossbar 84 in column 2, row 1, which may again be directed by switch 85 to output 86 of the same crossbar, connecting it to input 87 of crossbar 88. At this point it may only be routed to one of the six outputs of crossbar 88 by one of the six switches in that column of crossbar 88. It will occur to the reader at this point that three crosspoints are involved in transferring the message from input 81 to one of the outputs in crossbar 88.

The Clos network, it will also be noted, is generally constructed having square root of N rows (plus m rows of center crossbars, not labeled) by three columns. The network may be expanded and the number of switches further reduced by splitting the central portion into three in accordance with the teachings of Clos.

Figure 2:
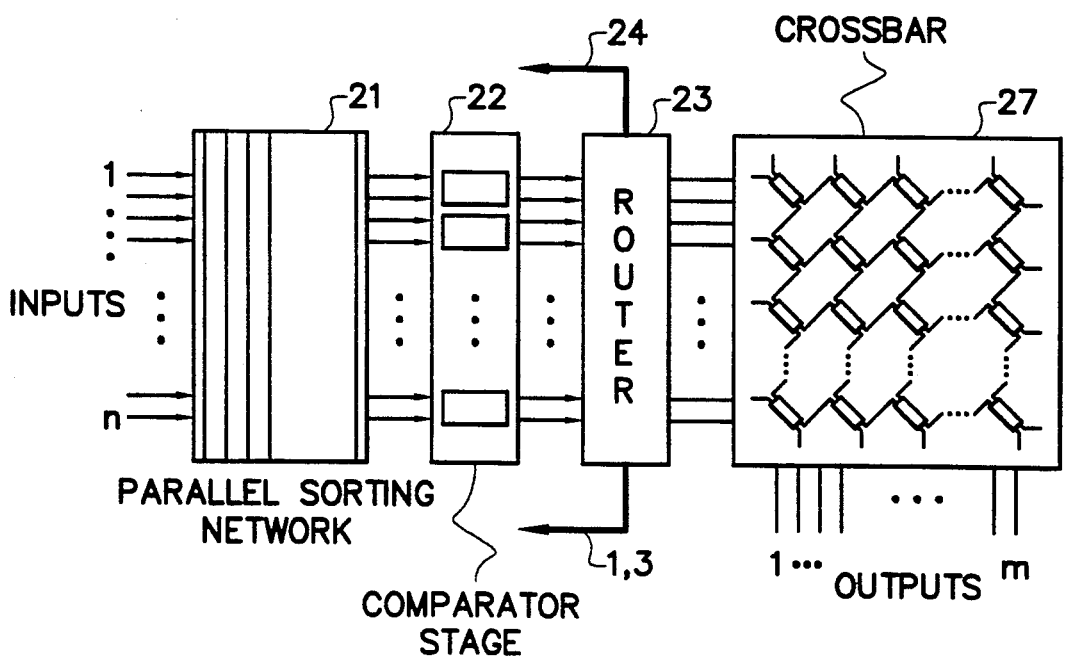
FIG. 2 is a block diagram of a trap network for removing connection request conflicts.

Refer now to FIG. 2 in which a trap network scheme is used to remove connection request conflicts before they happen, according to the design 20. This design is avoided by the invention. In FIG. 2, inputs 1−n are provided to a parallel sorting network 21 and provided, sorted, to a comparator stage 22. The comparator stage 22 provides an indication of a conflict to the duplicate router stage 23 along with each message being passed. The duplicate router stage 23 returns messages, along lines 24 or 25, to the inputs prior to the sorting network a, to be handled in accordance with whatever scheme is desired. For instance, either the message header itself may go back to the input node where the message header and the message may be directed to a buffer, or any number of other things may be desired for messages which may require resending at some other time. The crossbar 27 then allows its switches to be set in accordance with the instructions carried in the header which indicate the output address for each message routed through it. Using the teachings described herein, such an implementation, including units 21, 22, 23 and outputs 24 and 25, is not required.

Switches

Before moving on to a description of the algorithm for self-routing, and because it would create some complications to describe them later, a description of the switches which may be used with this device, or at least their functionality, is now described.

While this invention may be well suited to light switches, only the electronic versions are shown, however, it should be clear to one of ordinary skill in the art that light switches will provide enhanced flexibility allowing for return signals over any path once established. Higher speed communications, higher bandwidth and so forth become available when using light switching devices. Also, by not requiring messages to get a return routing, the return network described herein may even be avoided when using light switches.

The basic 2×2 switch can be seen in FIG. 5a, 50, as having two inputs, IN 1 and IN 2, and two outputs, OUT 1 and OUT 2. It may be generally set in either a pass or exchange mode. Under the pass mode, lines 51 and 52 will be open and lines 53 and 54 will be closed. In the exchange mode, the reverse is true.

In FIG. 5b, the switch 50 is shown in logic diagram form. The "change" in input 55 will control whether the switch is in the pass or exchange mode. Thus, when the input to 55 is zero, OUT 1 is open to I 1 and closed to I 2, and OUT 2 is open to I 2 and closed to I 1. When 55 is one, the reverse is true. OUT 1 is open to IN 2 and OUT 2 is open to IN 1.

Referring now to FIG. 6a, three modes of operation of a broadcast switch logical connection are shown, i, ii, and iii. In mode i, one input may be connected to both outputs. In mode ii, the inputs are connected to their direct outputs. In mode iii, the inputs are connected to their crossed outputs.

Figure 6B:
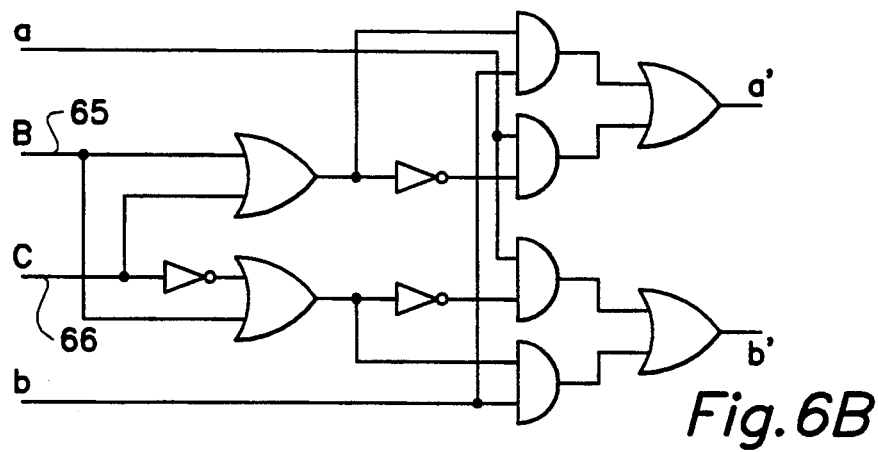
FIG. 6b is a diagram of a gate-level implementation of a broadcast switch.

In FIG. 6b, a gate-level implementation of such a switch is shown. Thus, where input 66 is zero and input 65 is hi (or "one"), the output of a' will be b and not a, and the output of b' will be a and not b, thus, a switch condition. If input 66 is zero, or low, and output 65 is also low, there will be a pass condition in which the output a' will not be b, but a, and the output of b' will not be a, but b.

Likewise, if the input 66 is hi and the output 65 is low, the input b will be passed on a', and the input b will also be passed on the output b'. In the case where both 66 and 65 are hi, the output of a' will be b, and the output of b' will be zero.

(This last condition is not preferred. The switch may be redesigned to eliminate this condition. As is also true with the gate-level implementation of the switches described previously, this switch may be designed differently as is well known to those of ordinary skill in the art.)

Figure 7:
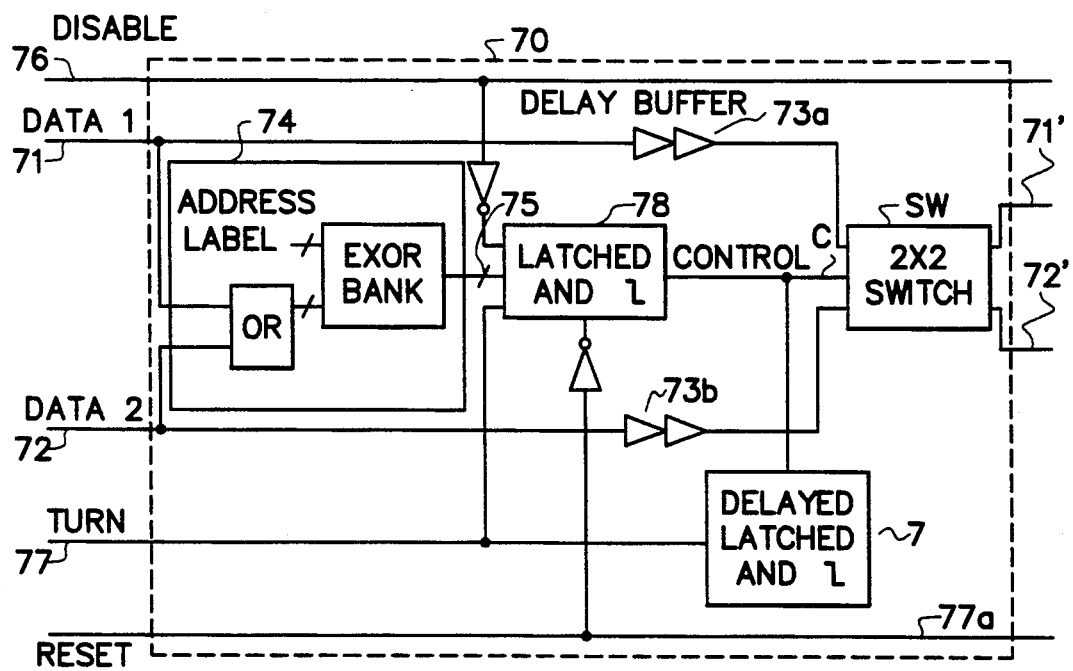
FIG. 7 is an electronic-level diagram of an implementation of a crossbar switch.

In setting the switches, or not setting them, or setting them into a broadcast state, this invention requires reference to the intended address of the message. Thus, it requires a device similar to that described with reference to FIG. 7, 70, which contains the 2×2 switch, sw. Input data containing the address is received by the crossbar switch device 70 across data lines 71 and 72. Depending on the overall implementation, either a serial or parallel input may be desired. Either way, a delay buffer 73a and 73b is provided before the data reaches the switch sw. The address label part of the message is read into the address comparator 74 at line 75. The signal output by comparator 74 on line 75 is positive if the switch address matches the appropriate part of the destination address. Such a positive signal on line 75 latches And-gate 78. In this way, if the And 78 is not disabled by line 76 or reset by a signal from line 77, the control output will provide input C to switch sw. The C signal also changes the output on 77a from "turn" to "no-turn" by means of latched And 78. Thus, all succeeding switches would receive the changed turn signal, allowing the message to continue down the column. Different schema for this switch which perform similar functions may be developed easily within the skill of those of ordinary skill in the art. This particular design is preferred for the networks and algorithms described, but variations will be apparent to those of ordinary skill in the art. For example, line 76 could be removed without any loss of function described herein. There may be parallel input paths if desired. May other variations may be constructed without circumventing this invention as claimed.

The Basic Self-routing Algorithm

Please refer to FIG. 1. The switches should all have a default setting, either pass or exchange, and all should be set in that mode when beginning to make any connections. For the preferred embodiment, the default setting is exchange. (If desired, the default settings and switches could all be reversed and appropriate adjustments made to accommodate the reversed order. Such adjustments would be principally to reverse the input lines to each switch. The switch itself may require redesign.)

When a message arrives at any switch, the header having a destination address will be routed along the row corresponding to the source from which it is sent. Thus, if it enters from input port or node 1, it will be routed along switches 1,1; 1,2; 1,3; ... 1,m. The message will be accompanied with a separate, active signal which will be denoted for the purposes of this explanation "turn". The label on the switch will be compared with the destination address in the header of the message at each switch at which the message arrives. If they are the same and the turn signal is high, the switch will be set into, for example, the pass mode, and the turn signal will be reset by the switch (see FIG. 7). If a destination label or indicator does not match the address of the switch, or if the turn signal is low, the switch will remain in the default mode (in the preferred embodiment, the case exchange mode). Thus, if a message is to be transferred from node 1 to output node 3, at switch 1,1, it will be told to exchange to switch 1,2 across line a'. The turn signal will not have been reset since it is to continue to travel across this row. No match has been made so the switch will remain in an exchange condition.

On arriving at switch 1,2, the message header will again be compared with the address of the switch. On again finding no match, and the turn signal again not reset, the message again will be exchanged through to switch 1,3 on line a'2. When the message reaches switch 1,3, the turn signal will be reset. When the control signal is provided to switch sw (see FIG. 7) because the address matches, the switch position will be changed to pass, and the message header and ensuing message will be transferred from input line a'2 to output line b'3 of switch 1,3. The same control signal C, will reset the turn signal to its opposite.

There are several ways to reset turn signals when the message is complete, such as resetting the entire network together at controlled intervals determined based on predetermined message sizing. However, the inventive concepts herein will work with numerous global or pass message reset techniques so these are not explained further here.

Refer now to FIG. 3 in which a network 30 is shown having nearly the identical layout as the network of FIG. 1. The difference here is that each one of the input nodes broadcasts its message across all of the columns of switches so that each one may compare its address at the same time, providing for much faster connections. These broadcast lines are indicated as lines 31–34.

Return Networks

Figure 4:
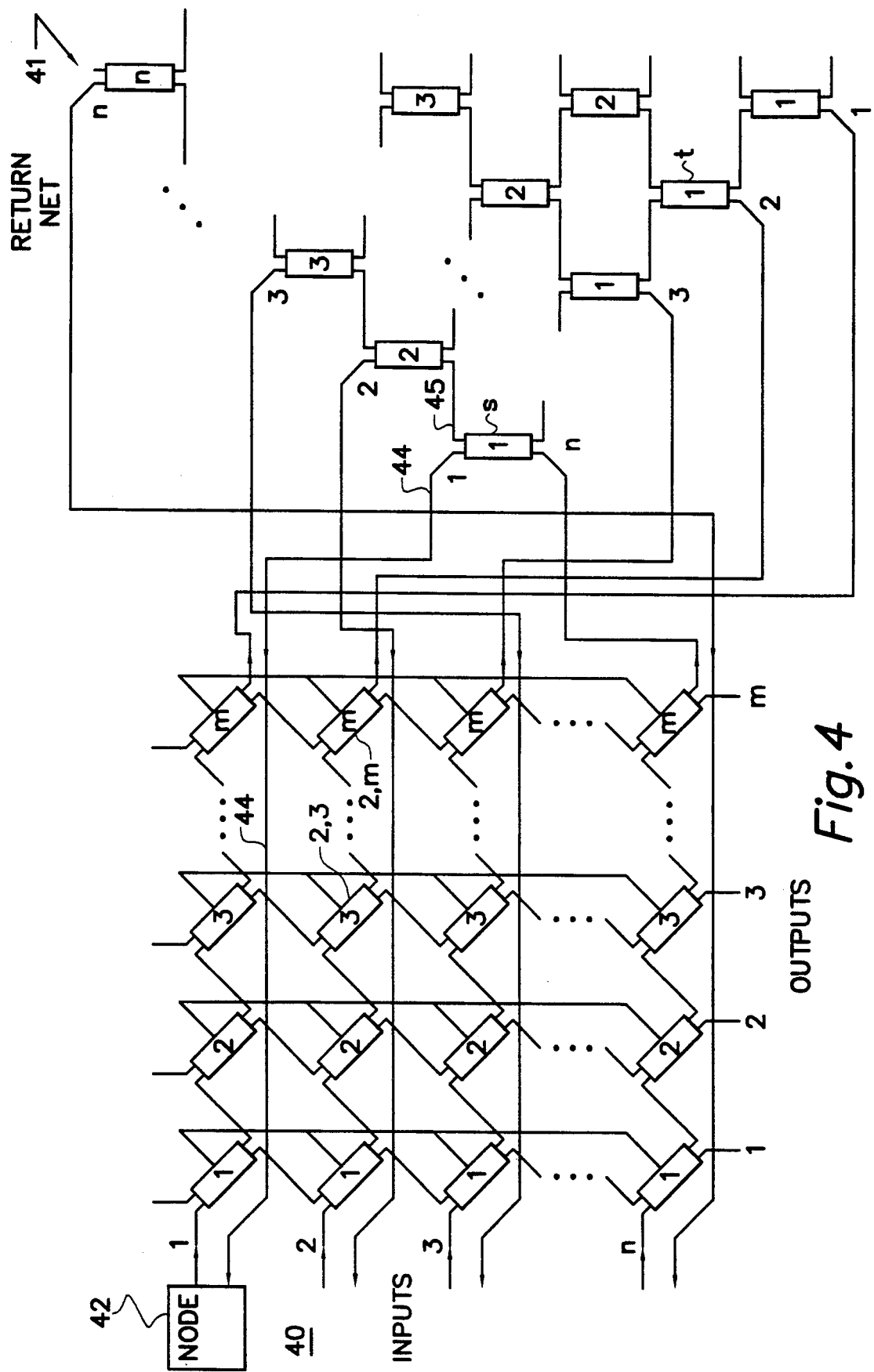
FIG. 4 is a layout of a n by m crossbar with an associated return network.

The key concept for eliminating the need for a conflict resolution device is the provision of the return network for each input node or line. A simplified implementation is described with reference to FIG. 4 in which a crossbar network 40 and an associated return net 41 are shown. For each node 42 or input line 1, an output as well as the input line is provided. A modification is also required in the header: both the destination address and the source address are required in order to route back the message which has found a conflict. Each should also have its own turn signal. The first part of the header should contain the destination address in the preferred embodiment. Thus, for a message from node 1, it is '1' of 1 to m outputs. If all goes well, the header routes itself to the proper output as described previously. However, if the destination output line is already busy, the header will be diverted to the return network 41. Consider, for example, a case where input node 42 using input line 1, and a second input node using input line 2, have connection requests for output node 3 (and thus send messages with headers to node 3). The header from the second node, for example, reaches the switch 2,3 before the header from node 42, if the two headers are clocked out together. Thus, switch 2,3 will be set (in the preferred embodiment) into the pass mode by the header from the second node and, therefore, the header from node 42 (input line 1) on arriving at node 2,3 will be routed through switch 2,n into the return net 41.

The switches in the return net will look only at the source address part of the header and its associated turn signal. Since the source has sent a message request, it should not be busy when it receives the request back, in this case across line 44. To get there it will have come through switch s from switch t. The routing through the switches in the return net may work exactly the same way as in the forward net, with a separate turn signal for the sending address, which is only reset when the switch address matches the origin address, and it then stays in reset condition through the switches in that (diagonal) return switch line until the header with its message (if any) is returned across one of the long horizontal lines in the crossbar (see FIG. 15). (In cases where it is being routed back to a previous stage crossbar, the turn signal must change again before it is processed in the lower stage.)

Figure 15:
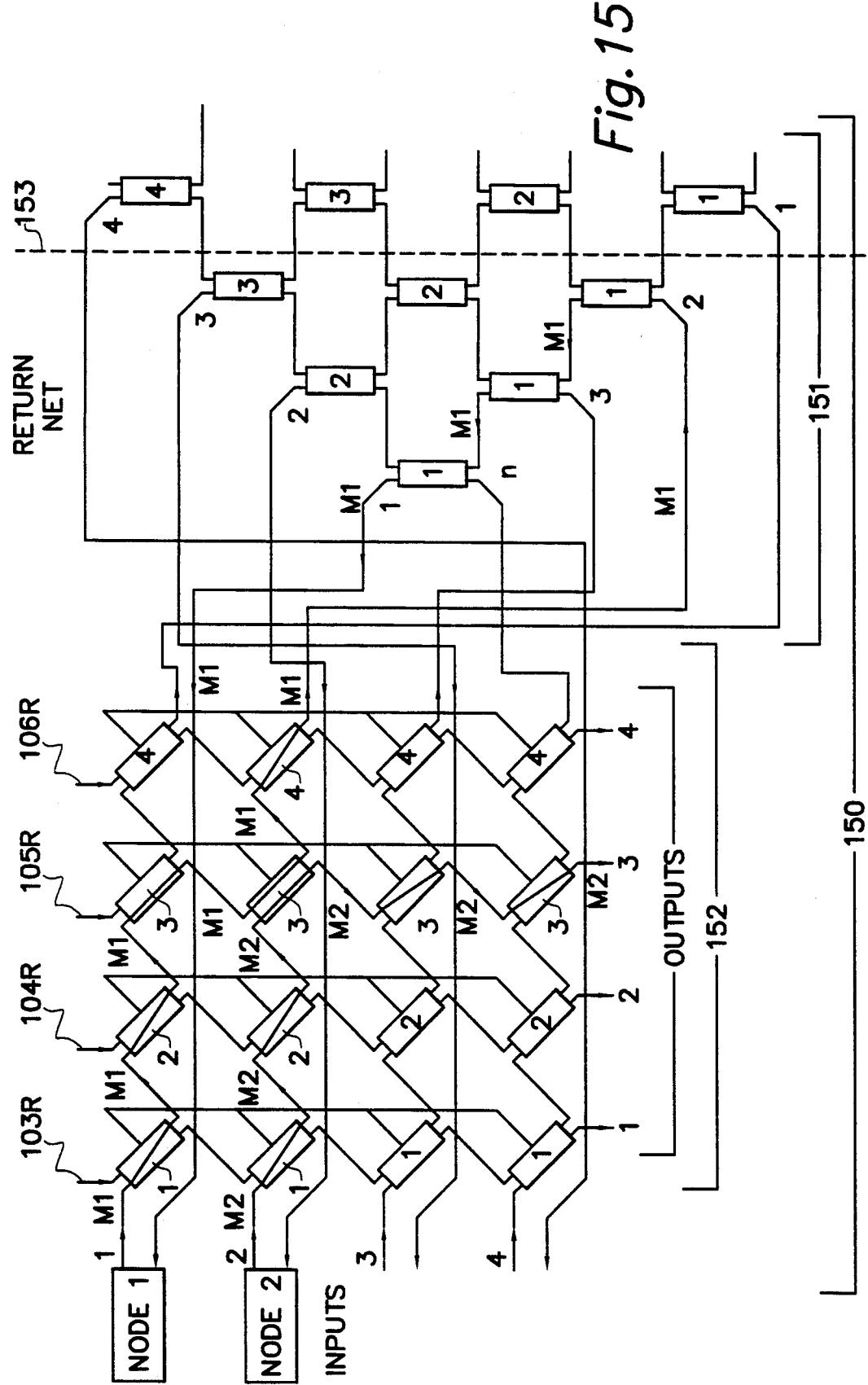
FIG. 15 is a drawing of a complete 4×4 crossbar with associated return net.

See FIG. 15 (or FIG. 4) for a complete 4×4 array of switches 150 and an associated return network. If Node 1 sends a message $M_1$ at the same time Node 2 sends a message $M_2$ the routing through both the crossbars and the return net 151 can be traced on this diagram as labelled by following the $M_1$ and $M_2$ labels. (Note that to the right of dotted line 153, the switches may be shorted permanently if a different turn signal scheme is used than that described in the preferred embodiment.) (You can also eliminate the connection from the topmost row switch in the crossbar to the return net and the lower right corner switch in the return net because no output from row i will ever need to be returned unless the crossbar receives messages back from a later stage crossbar by bus.)

The Clos Implementation

This self-routing algorithm may be applied to any N×N Clos network with r n×m crossbars in the first and third stages, and where m=N, m r×r crossbars in the second stage. Also, because we are interested in TNBs, m·2n−1.

Previously, solving a self-routing crossbar network problem in a distributed manner, permutation of the rn requests such that the requests (to route a message) routed to addresses in different crossbars in the third stage are routed from different crossbars in the input stages. See, for example, Lin et al, *Two-Dimensional Optical Clos Interconnection Network and Its Uses*, Applied Optics, Volume 27, No. 9, May 1, 1988, pp. 1734–1741. This solution, however, requires permutating or rearranging all nr requests simultaneously and cannot be implemented in the self-routing distributed manner used by this invention.

The self-routing approach described previously works fine for crossbars but not for Clos networks. The important inventive aspect for Clos networks for achieving non-blocking self-routing is in selecting the crossbars to be used in routing the requests through the second stage of the network. Therefore, when conflicts are detected in the first n shared crossbars of the second stage crossbars, these messages are re-routed using the remaining n−1 crossbars in the second stage.

"Greedy" Self-Routing Algorithm For Multistage or Clos Networks

Figure 9:
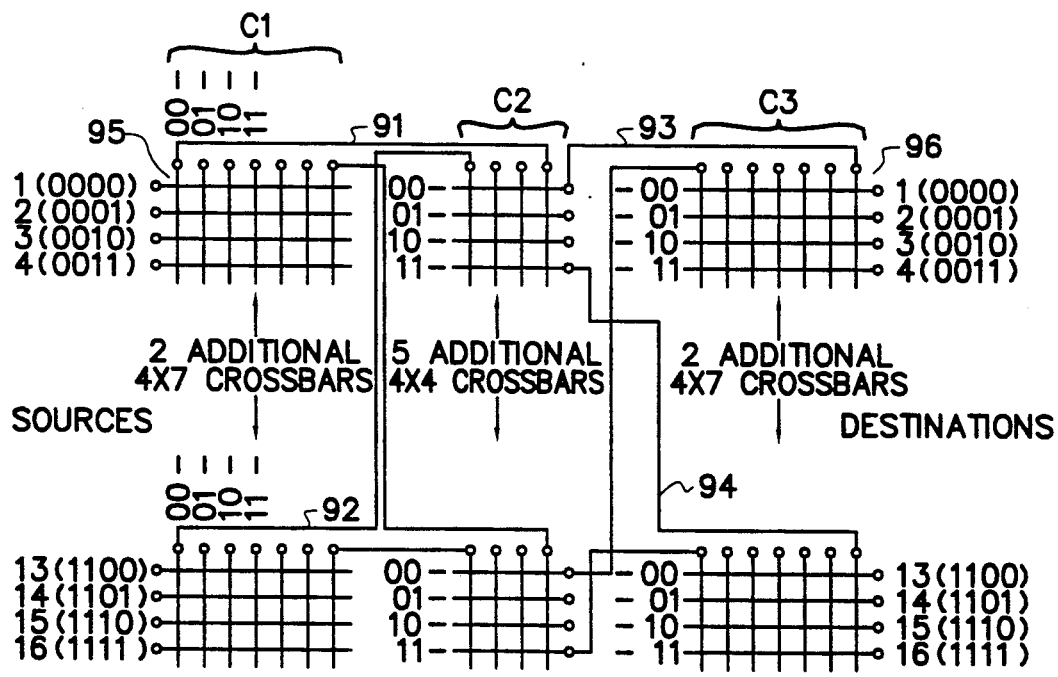
FIG. 9 is a 16×16 Clos network diagram.

Refer now to FIG. 9 which illustrates a crossbar network similar to that illustrated in FIG. 8 but smaller. Each input line C1 has an address, in this network being a 16×16 Clos network there addresses being (for base 10, 1 through 16 but as shown) for base 2, 0000 through 1111. The destination addresses in column C3 have the same designation and C3 is likewise comprised of the same number of crossbar switches. C2 has a greater number of smaller crossbar switches in accordance with the requirements of a Clos network. (The crossbars in columns C1 and C3 are of size n by 2n−1). For the purposes of the preferred embodiment if the number of crossbar switches in C1 and C3 is not a power of 2 (thus r is not a power of 2) the number should be increased until a power of 2 is achieved.

Thus it can be seen that, for the preferred embodiment, with four digits the number of bits and the label for each address is $|\log_2 r|$.

In the preferred embodiment again, no switches are considered latched thus they are all in the pass position.

When any message arrives at any switch, the header containing the destination address is routed following the self-routing algorithm described above for the first column. The destination address will be made up of two parts: the output crossbar address of $|\log_2 r|$ bits and a local destination address $|\log_2|$ bits within the individual crossbar. This matching is performed only on the first $|\log_2|$ bits.

If the message header finds that the desired address ($|\log_2 r|$, say 00—) output is busy in the first of the intermediary switches in column C2, it will be routed to the next intermediary switch and so on until a path to the crossbar switch in column C3 desired is achieved. Thus the algorithm is termed greedy in that any unused column may be used for routing. In the illustrated example of FIG. 9 the address 00— was free and a connection made on 91 to the second stage crossbar is C2. The other message that wants this crossbar is coming in on 92. If they are going to different final crossbars as shown, across lines 93 and 94 there is no problem, otherwise the second message through will be blocked and have to be rerouted. This is why the greedy algorithm was created.

The key to resolving conflicts in each stage is the use of the crossbar with the return network for conflict detection and resolution. Stage 1 and 3 conflicting requests, due to true input request conflicts (where two input requests specify the same output address) are returned to the source node. However, conflicts in the second stage or second column that arise due to sharing of the crossbars in the second stage are resolved by detecting conflicts in those labelled crossbars and then, on receiving the return header, scanning available connections in the remaining second column crossbars. In the worst case then, a request may scan through n outputs in its stage one or C1 crossbar before its request is met by the (2n−1)th output.

Another way to say this is there are two forms of conflict that can occur, the first occurs in the first or third stages due to direct input conflicts. This can be where two or more inputs request the same output address in the third stage or subaddresses in the first stage. These are handled by the conflict resolution as described in the case of the single crossbar. The second kind of conflict arises due to the sharing of crossbars in the middle stages and requires scanning the last n−1 free crossbars to resolve the conflicts.

Because of these multiple stage conflicts, crossbars 20 in the second or middle and third stages must provide return paths so that when the header part of the message is sent, the response can be sent back to the source to confirm that a routing path is available. Thus, the multistage network acts more like a router than a pure interconnection network.

Figure 10:
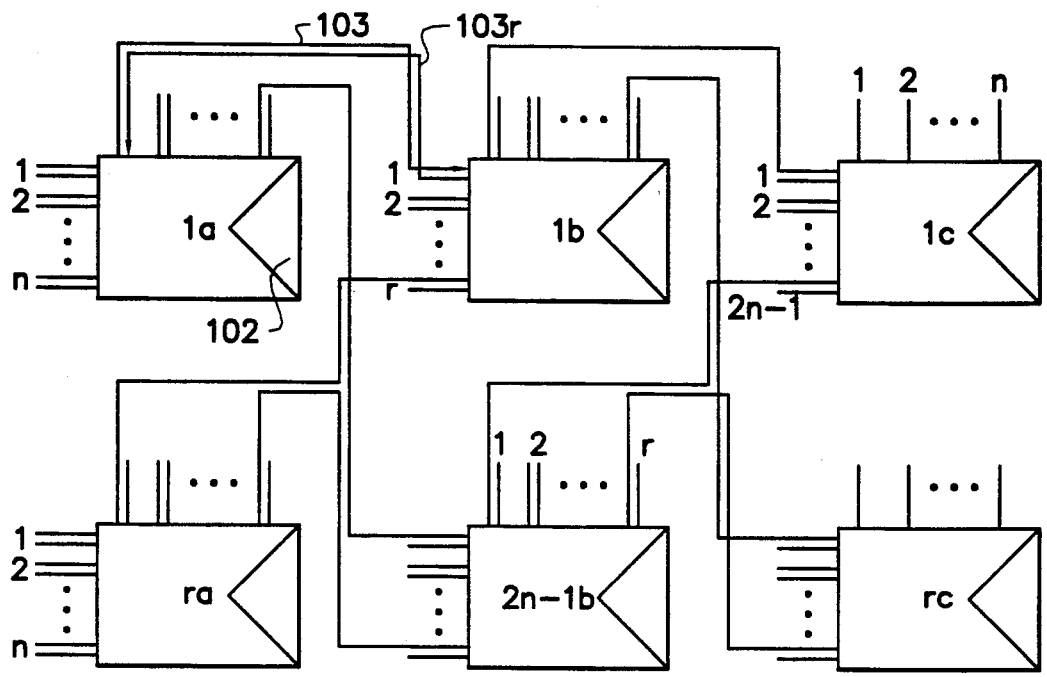
FIG. 10 is a layout of a non-blocking nr×nr self-routing Clos network with return networks.

Please refer to FIG. 10 which describes such a system, including the return nets and extra return paths.

Again, if light switches are used, return paths may be obviated because the light can travel back over the same open switch that it traveled to get to the destination node. It should also be noted here that electronic switches with return paths opened at the same time and location as sending paths would also obviate the need for a return net or separate return path system.

Crossbars $1_a$ to $r_a$ establish the first stage, $i_b$ to $2n-1_b$ the second and $1_c$ to $r_c$ the third. Each has a return net 102, similar to the one described in detail with reference FIG. 15. For every connection between crossbars like line 103 there is a return line like 103r. Please refer briefly back to FIG. 15 and line 103r thereon.

For ease of explanation, assume the network is populated with 4×4 crossbars in the first stage like 150 of FIG. 15. Output 1 goes to the first crossbar in the second stage, output 2 to the second, etc. The line returning from the first crossbar of the second stage would be line 103r, from the second crossbar of the second stage would be line 104r, from the third crossbar of the second stage would be return line 105r, and from the fourth crossbar of the second stage, the return line would be 106r.

Reviewing the two message state of crossbar 150 described earlier, two messages, $M_1$ and $M_2$, have tried to reach output 3, only message $M_2$ made it. $M_1$ was returned. Let us assume $M_2$ did not make it through the third crossbar of the second stage. It would then be returned on line 105r. Switch 3 in the first row is still held in the pass mode and the network message is routed through across to the return net. The return net routes the message back to node 2. (All switches, once changed from the default state, should be held in that state for the maximum delay required for the message to return if blocked at the last stage.) $M_2$ then would be routed through the second row, 4th column switch, into the return net which would forward the header back to node 2, using the return address. As in the explanation which follows, destination address can then be incremental and the header resent.

Figures 11A, 11B, 11C:
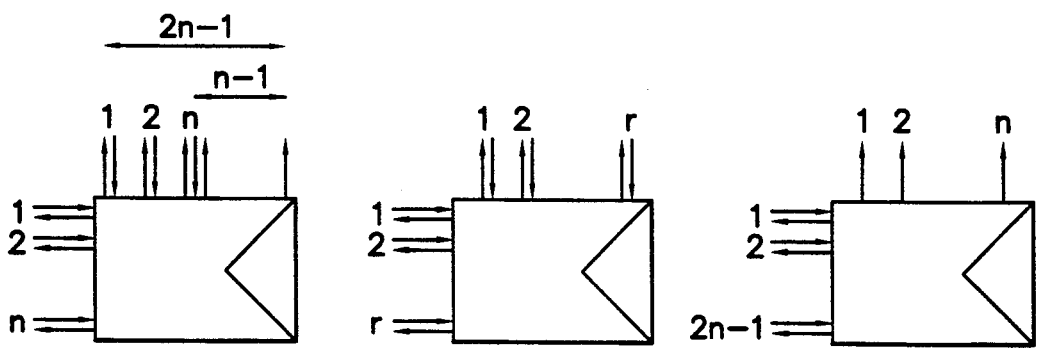
FIGS. 11a, b and c are diagrams of the inputs and outputs of the crossbars used in FIG. 10.

FIGS. 11a, b, and c detail the number of lines used in each of the crossbars of FIG. 10.

The remaining detail is how to scan to the next or subsequent second stage crossbar when the original choice is blocked. When the message is returned to its originating node, the header's destination address is simply incremented and the header reset to try the next second stage switch. The incrementing is only done to the first part of the destination address, however. So, for example, (with reference to FIG. 9 assuming it has return nets), if output node at receiving address 0000 wants to send a message to a receiving node at 0000, the incrementing can be done to the first two digits of the 0000 address, making the next attempt through line 01-of crossbar 95. This would send the header to the second crossbar in C2 (not shown) whose switches would look at the second part of the destination address, thus routing the message to the correct stage 3 or C3 crossbar, in this case crossbar 96. If a third crossbar in stage 3 is tried, because the second part of the destination address remains unchanged, the message will still be routed to crossbar 96 if the output address is 0000.

Use of Busses

Instead of Clos networks having an intermediary stage or set of stages of crossbars, they can use busses for routing messages. This embodiment further reduces the number of switches but adds complexity in that it requires bus controllers.

Figure 12:
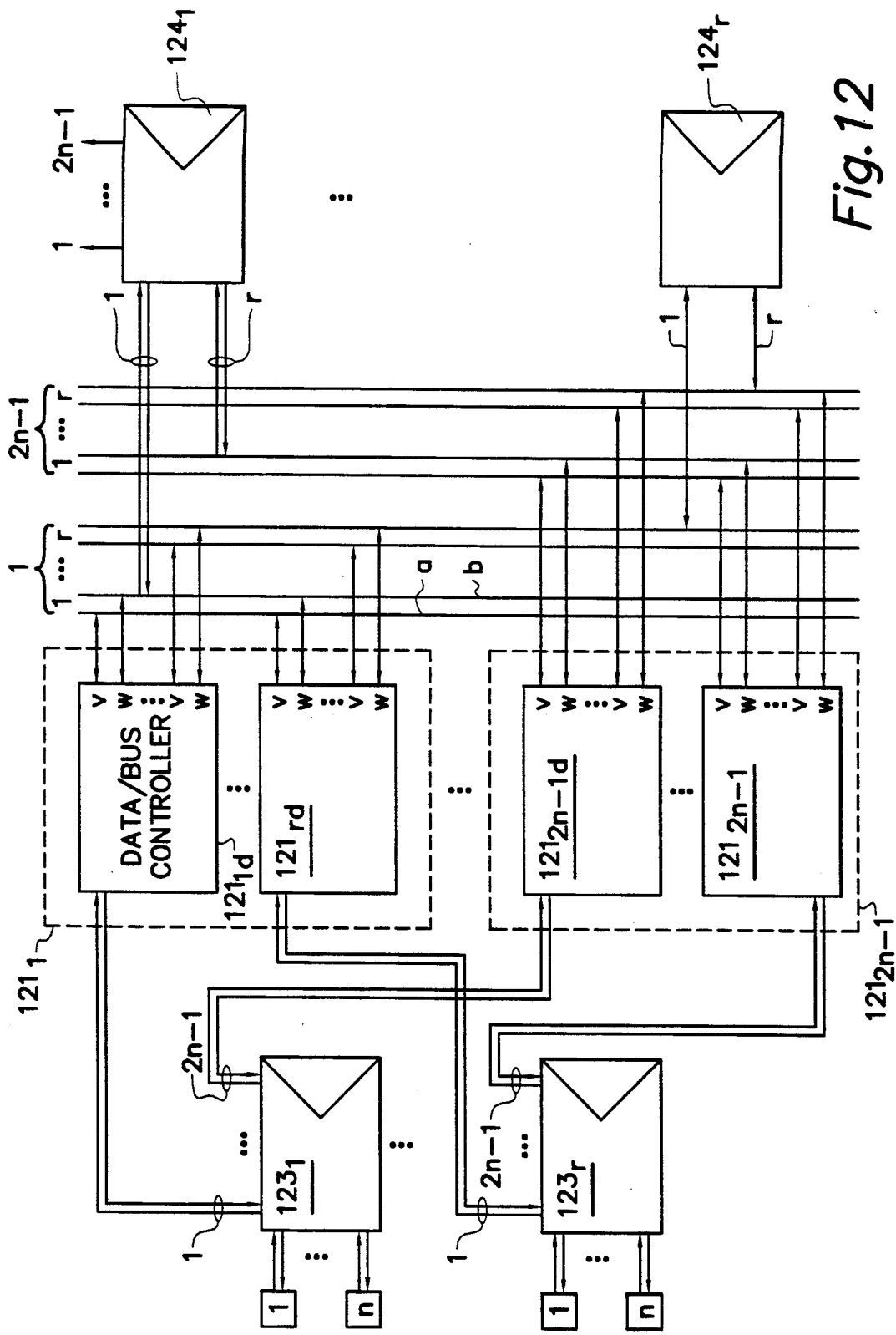
FIG. 12 is a schematic diagram of the bus implementation of a truly non-blocking network in accord with the invention.
Figure 13:
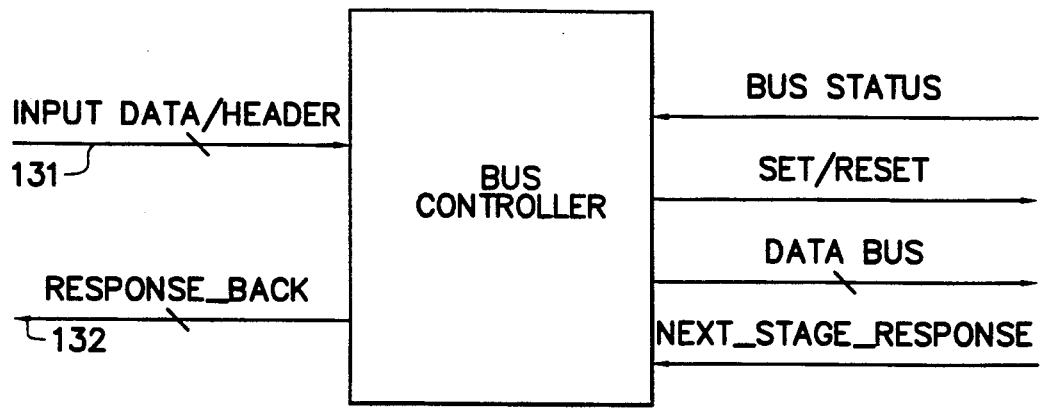
FIG. 13 is a block diagram of a finite-state machine model of the bus controller which may be used with the invention as described in FIG. 12.

Refer to FIG. 12 in which a network 120 is shown having again 1 through r crossbars with return nets for both the first and third stages. Again, as in FIG. 10, the return lines are shown attached near the sending node even though they are located as described with reference to FIG. 15 on the side opposite the output. The difference in structure between this FIG. and FIG. 10 is that there are $2n-1$ controllers $121_1$–$121_{2n-1}$. Each controller itself has a set of r data bus controllers $121_{1d}$–$121_{rd}$.

The algorithm, however, works about the same way on this structure as it does on the kind illustrated in FIG. 10. Thus, a signal or message sent from node 1 of crossbar 123, passes on output line 1 to Data and Bus Controller $121_{1d}$. If the message is supposed to go to crossbar 124, for one of its 1 to $2n-1$ outputs it will try line 1 of its set of busses. If there is no "busy" signal set by some v output on line a of bus 1, the message will pass onto the bus line b on output w. These v and w outputs are hi-directional (or may be paired inputs and outputs, thus 2 v's and 2 w's if desired).

If this bus line is busy, the message will be returned to node 1, incremented and resent on line 2 (not shown) to the next controller. The next controller $121_2$ (not shown but next in series) would try line 1 of its first Data/Bus Controller, which also connects to crossbar 124. This would go on until line $2n-1$ of crossbar $123_1$ is tried, and a link attempted through Data and Bus Controller $121_{2n-1d}$ is tried and its line 1. If still unsuccessful the next increment can reset the header to try line 1 and start the cycle over. Enhancements to this concept, such as sending a signal backward beyond the input node to cancel a message or resend later, should be apparent to one of ordinary skill in the art, without going outside the scope of this invention.

(Note also that there are single input/output lines between busses and crossbar 124r and paired input and output lines between busses and crossbar 124, in the drawing. This is done to show that it could be either way, although it would be preferred if all the crossbars in a stage are connected to busses in the same manner).

Figure 14:
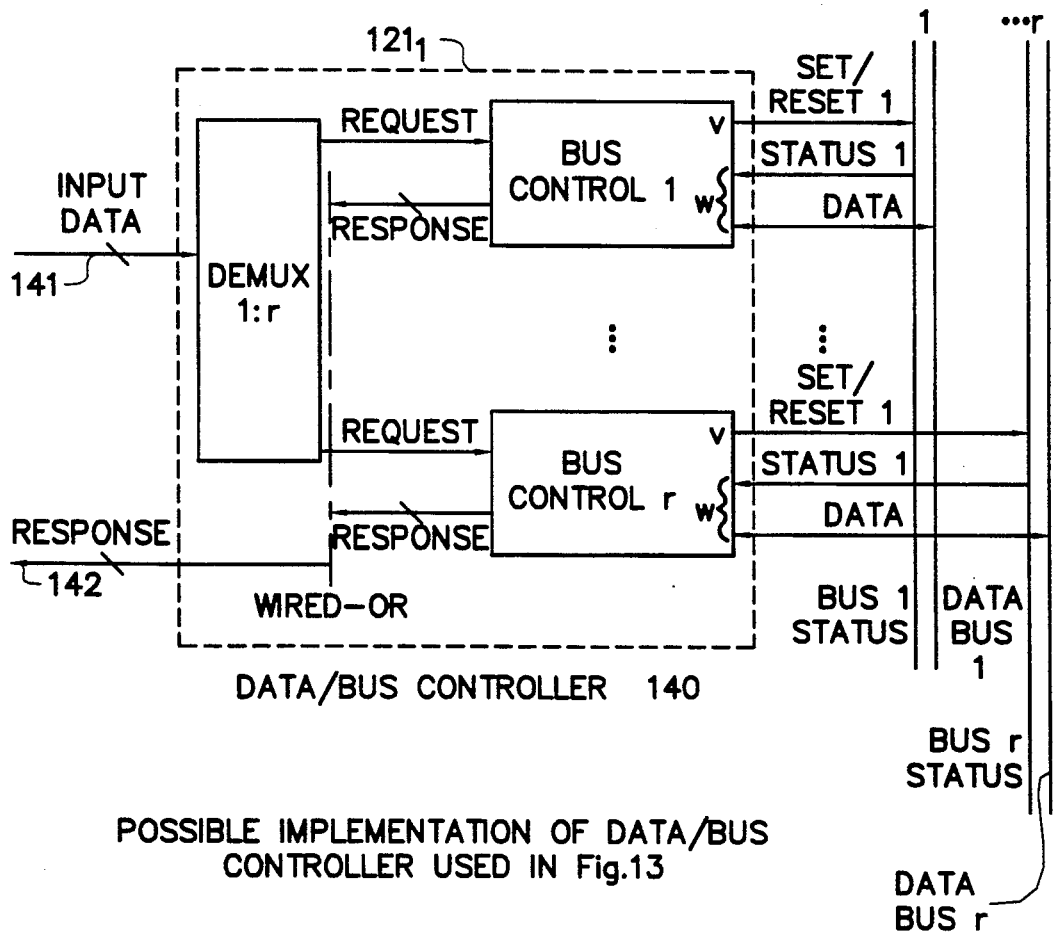
FIG. 14 is a detailed schematic diagram of the databus controller blocks employed in one of the 2n−1 databus controller blocks used with the invention as described with reference to FIG. 12.

The data/bus controller is next described for completeness. Refer first to FIG. 14 in which a bus controller 140 is shown. This is essentially an exploded view of the box labeled $121_1$ in FIG. 12. However, the diagram also illustrates a variation in embodiments in which a demultiplexer is used rather than an input and output line from and to each one of the first stage crossbars and their return networks. The input data coming in on line 141 is demultiplexed by looking at the destination address, first part, and the request is sent to one of the bus control units, say bus control 1. Bus control 1 then needs to seize databus 1 in order to send the message as data across the data line to databus 1. To do so it first checks the status of bus status 1 to determine if databus 1 is busy. This is done on line status 1. If it is not busy, it places a high signal or other appropriate signal on bus 1 status line across the set/reset 1 line of bus control 1. If the status is busy, bus control 1 will rerout the request out the response line which is wire-ored to line 142. A turn signal will be tagged onto this returned message so that it may find its way back through the return net. As was described in the earlier implementation, such a turn signal for return coming from a intermediary level or second stage crossbar was not required because each line went to the appropriate address in the return net.

FSM of the Bus Control

1. Inputs: Parallel Input Data/Header bus, the Bus Status (0/1), and the Next—Stage Response, a single packet of data equal to the bus width, usually a header bit, and the source and destination addresses sent back from the next stage. The input Data/Header always contains 2 reserved bits for routing.

2. Outputs: Data Bus, parallel output header/data to the next stage, Set/Reset control for the bus status line, Response—Back lines that contains a bit (available or note available) and source/destination information which may also be obtained form the Next—Stage—Response.

Note the bus lines are tri-state (low, high, high impedance) to distinguish between no signal and O-valued signal.

3. State Transitions:

```
IF Input Data/Header bit = 00 /*leading bit denotes
header or message packet*/
    AND Bus_Status =1 /*Bus occupied or busy*/
        THEN Response_Back = 0!Input Data/Header;
        /*send a not_available signal in response*/
    ELSE
            Response_Back = 1!Input Data/Header;
            /*send available signal in response*/
            Bus_Status = 1 /*set bus status busy —
            reserve the bus lines*/
ELSE IF Input Data/Header bit = 10 /*message
packet received after the source received an
available signal*/
    Data Bus = Input Data/Header /*output
    bus = input bus — transmit data*/
    IF Input Data/Header bit = 11/*special code for end
of message*/
        THEN Bus_Status = 0 /*free the bus*/
        Data_Bus = XXX /*set bus back to high
        impedance state*/
```

We note that this implementation in routing through the second stage assumes that the source node operates in two modes: first it sends out the requesting header packet. If the response received from the routers is negative, it retransmits the headers until it obtains a connection. Second, if a positive response is received, the source node transmits its message in packets until it frees all the latches switches in the crossbars or the busses it had used.

Routing Delays

We will only consider the average delays in setting up the routing path in the bus-based self-routing Clos network. The average delays in the first and third stage as before is $(n+1)$ for the X1 implementation and $n/2$ for the X2 implementation. The delay in the second stage is not as simple. Consider the delay in determining a conflict using the Data/Bus Controller architecture. From FIG. 14, it will be clear that determining the availability of a connection is $t_A$ (access time)=-

($\log_2 r + k$) where $\log_2 r$ is delay in the demultiplexer while k is a constant due the latching delay in the FSM of the bus control and response logic. This delay $t_A$ is repeated at most n times if in the worst call all free n crossbars in the second stage are scanned. Thus, the worst case delay in setting up the routing path in this implementation is $O(2n + n\log_2 r)$. Once the routing path is set up, the switching delay is smaller since no conflicts have to be further resolved. Since the optimal value of $r = n = \sqrt{N}$, the worst case delay in setting up the routing path is $O(\sqrt{N}(2 + \log_2\sqrt{N}))$ (only $O(\sqrt{N})$ for normal routing delay). We believe an optical implementation may have lower delays than the electronic one when implementing the switch version.

Broadcasting in CN's follows very simply from the above self-routing scheme. To implement broadcasting CN's, broadcasting switches discussed above must be used for the individual crossbars in the CN. The only difference in the broadcasting is the limit on the maximum number addresses to which a message can be broadcast. If the original Clos design is used, the limit is (n−1). This limit is imposed by the maximum number of crossbars used in the second stage.

What is claimed is:

1. A crossbar for use in a switching system which switches messages having headers, wherein the headers have source and destination addresses and two turn signal indicator means, one of each of which is associated with these respective addresses, said turn signals being both set at the time the message is sent, and wherein the crossbar has a number of inputs, n, from n sources, and a number of outputs, m, to m destinations, wherein the n inputs are connected to said m outputs by an n×m array of 2×2 switches organized into logical columns and logical rows labeled 1 to m and 1 to n, respectively, and each switch having an internal representation of at least part of said address, and wherein said switches may be set into one of two modes, either a pass or exchange mode, but all said switches are set into the same of said two modes a, called a default mode, at an initial time, said switch's mode is otherwise set based on the coincidence of two events;

the first event being that a message header destination address, upon reaching a switch is determined by said switch to match the internal representation of the column address of that switch; and the second event being that the turn signal in said message header has not already been rest by a previous switch in the path of said message header which also had a matching column address, and wherein said crossbar has in communicative association therewith a return network having similar or identical 2×2 switches organized into logical diagonals with respect to the logical organization of the crossbar switches, the diagonal having the number of switches that is largest of all diagonals having switches with internal address matching row 1, and each succeedingly smaller diagonal having succeedingly larger addresses and less switches, with the ultimate diagonal having one switch of address "n", and wherein these switches are setable into pass or exchange mode based on the coincidence of two events occurring at each switch in said return net, but all said return net switches set into the same mode, called default mode, at an initial time; the first event being that the message header source address upon reaching a return net switch, matches the diagonal address of the switch; and second, that the turn signal has not already been rest by a previous switch with the same column address.

2. A crossbar as set forth in claim 1 wherein the default mode is exchange.

3. A crossbar as set forth in claim 1 wherein the default mode is pass.

4. A crossbar as set forth in claim 1 wherein the switches are broadcast switches.

5. A crossbar as set forth in claim 1 wherein every switch in the crossbar is maintained in the non-default condition for at least as long as the maximum delay required for a message header to be returned to that switch from its destination address in the switching system.

* * * * *